United States Patent
Hansen et al.

(10) Patent No.: US 7,162,204 B2
(45) Date of Patent: *Jan. 9, 2007

(54) CONFIGURABLE SPECTRAL MASK FOR USE IN A HIGH DATA THROUGHPUT WIRELESS COMMUNICATION

(75) Inventors: Christopher J. Hansen, Sunnyvale, CA (US); Tushar Moorti, Mountain View, CA (US); Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 10/778,754

(22) Filed: Feb. 13, 2004

(65) Prior Publication Data

US 2005/0113101 A1    May 26, 2005

(51) Int. Cl.
*H04B 15/00* (2006.01)
*H04K 1/10* (2006.01)

(52) U.S. Cl. .................. 455/63.1; 455/452.1; 455/509; 370/465; 375/260

(58) Field of Classification Search ................ 455/445, 455/509, 450, 513, 452.2, 454, 455, 516, 455/307, 296, 266, 65, 63.1, 452.1; 370/465, 370/290, 288, 291, 901, 389; 375/260, 346, 375/350, 216, 271, 296, 302
See application file for complete search history.

(56) References Cited

U.S. PATENT DOCUMENTS

| | | | |
|---|---|---|---|
| 6,563,880 B1 * | 5/2003 | Hunsinger et al. | 375/260 |
| 6,940,913 B1 * | 9/2005 | Verbin et al. | 375/260 |
| 7,031,690 B1 * | 4/2006 | Prodanov et al. | 455/338 |
| 2004/0234001 A1 * | 11/2004 | Huynh et al. | 375/260 |
| 2004/0266372 A1 * | 12/2004 | McCallister | 455/127.2 |
| 2005/0070231 A1 * | 3/2005 | Jensen | 455/73 |
| 2005/0111449 A1 * | 5/2005 | Moorti et al. | 370/389 |
| 2006/0030267 A1 * | 2/2006 | Bhardwaj et al. | 455/63.1 |

* cited by examiner

*Primary Examiner*—Charles N. Appiah
(74) *Attorney, Agent, or Firm*—Garlick Harrison & Markison

(57) ABSTRACT

A configurable spectral mask for a channel for use in a wireless communication includes a channel pass region, a floor region, and a transition region. The channel pass region provides a first usable signal bandwidth of a plurality of usable signal bandwidths corresponding to a first channel width of a plurality of channel widths. The floor region provides a first floor attenuation value of a plurality of floor attenuation values corresponding to the first channel width. The transition region providing a first transition attenuation of a plurality of transition attenuations from the channel pass region to the floor region, wherein the first attenuation region corresponds to the first channel width.

24 Claims, 4 Drawing Sheets configuration spectral mask 100

| channel width | channel pass region | transition region | | | floor region |
| --- | --- | --- | --- | --- | --- |
| | | 1st attn | 2nd attn | 3rd attn | |
| 40 MHz | 36 to 40 MHz | -20 dBr per 1 to 5 MHz | -8 dBr per 8 to 20 MHz | -17 dBr per 20 MHz | <= -45 dBr |
| 20 MHz | 16 to 19 MHz | -20 dBr per 1.5 to 3 MHz | -8 dBr per 10 MHz | -12 dBr per 10 MHz | <= -45 dBr |
| 10 MHz | 7 to 10 MHz | -20 dBr per 0.5 to 2 MHz | -8 dBr per 5 MHz | -12 dBr per 5 MHz | <= -45 dBr | ions), the participating wireless communication devices
CONFIGURABLE SPECTRAL MASK FOR USE IN A HIGH DATA THROUGHPUT WIRELESS COMMUNICATION

BACKGROUND OF THE INVENTION

1. Technical Field of the Invention

This invention relates generally to wireless communication systems and more particularly to high data throughput communications in such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

The assigned channel, or channels, over which the direct or indirect communication occurs is defined by the standard, or standards, supported by the wireless communication devices. For example, IEEE 802.11 (a) and (g) provide a channel spectral mask for 20 MHz orthogonal frequency division multiplexing (OFDM) channels. As is known, the spectral mask defines in-band regions of a channel and out-of-band regions of the channel such that interference from other channels is limited. Despite these parameters, interference energy still appears on top of the desired signal. Further, the spectral mask and channel width are fixed, thus cannot be adjusted for different wireless communication applications.

Therefore, a need exists for a configurable spectral mask that enables wireless communication devices to reduce interference from other channels and to use varying channel widths to support a variety of wireless communication applications and/or data rates.

BRIEF SUMMARY OF THE INVENTION

The configurable spectral mask for use in a high data throughput wireless communication of the present invention substantially meets these needs and others. In one embodiment, a configurable spectral mask for a channel for use in a wireless communication includes a channel pass region, a floor region, and a transition region. The channel pass region provides a first usable signal bandwidth of a plurality of usable signal bandwidths corresponding to a first channel width of a plurality of channel widths. The floor region provides a first floor attenuation value of a plurality of floor attenuation values corresponding to the first channel width. The transition region providing a first transition attenuation of a plurality of transition attenuations from the channel pass region to the floor region, wherein the first attenuation region corresponds to the first channel width.

In another embodiment, an apparatus for transmitting via a channel in a high throughput wireless local area network includes a processing module and memory. The memory stores operational instructions that cause the processing module to: (a) establish a channel pass region to provide a first usable signal bandwidth of a plurality of usable signal bandwidths corresponding to a first channel width of a plurality of channel widths; (b) establish a floor region to provide a first floor attenuation value of a plurality of floor attenuation values corresponding to the first channel width; and (c) establish a transition region to provide a first transition attenuation of a plurality of transition attenuations from the channel pass region to the floor region, wherein the first attenuation region corresponds to the first channel width.

In yet another embodiment, a radio frequency (RF) transmitter includes a baseband processing module and a radio transmitter. The baseband processing module is operably coupled to establish a configurable spectral mask and to convert outbound data into outbound baseband signals. The baseband processing module establishes the configurable spectral mask of a channel for a high data throughput wireless communication in a wireless local area network by:

(a) establishing a channel pass region to provide a first usable signal bandwidth of a plurality of usable signal bandwidths corresponding to a first channel width of a plurality of channel widths; (b) establishing a floor region to provide a first floor attenuation value of a plurality of floor attenuation values corresponding to the first channel width; and (c) establishing a transition region to provide a first transition attenuation of a plurality of transition attenuations from the channel pass region to the floor region, wherein the first attenuation region corresponds to the first channel width. The baseband processing module converts the outbound data into the outbound baseband signals in accordance with the first useable signal bandwidth of the channel. The radio transmitter is operably coupled to convert the outbound baseband signals into outbound radio frequency (RF) signals and to transmit the outbound RF signals in accordance with the configurable spectral mask.

DETAILED DESCRIPTION OF THE INVENTION

Figure 1:
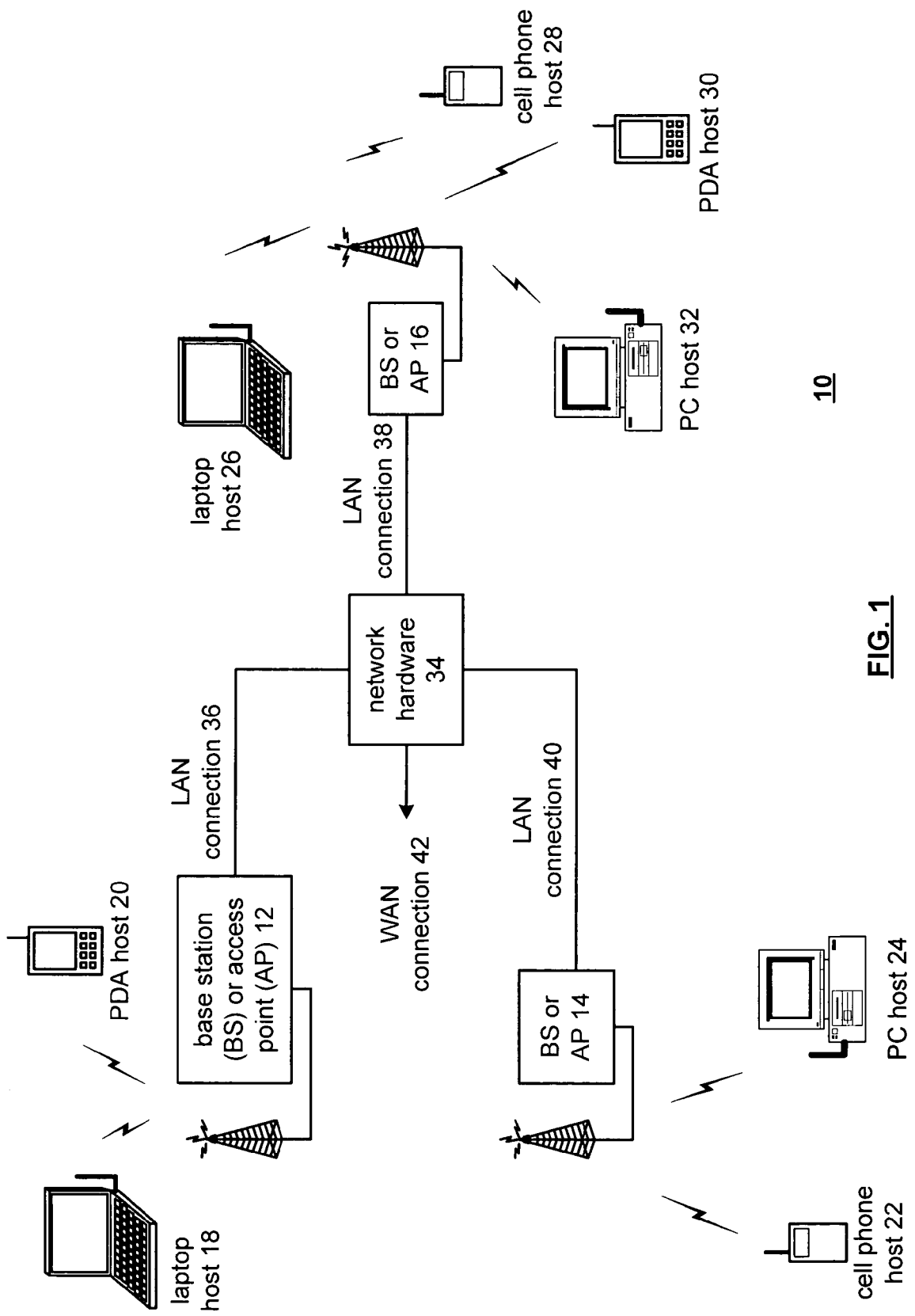
FIG. 1 is a schematic block diagram of a wireless communication system in accordance with the present invention.

FIG. 1 is a schematic block diagram illustrating a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area via one or more configurable channels within one or more frequency bands. Typically, the wireless communication devices register with a particular base station or access point 12–14 to receive services from the communication system 10. For direct connections (i.e., point-to-point communications), wireless communication devices communicate directly via an allocated channel of the configurable channels.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
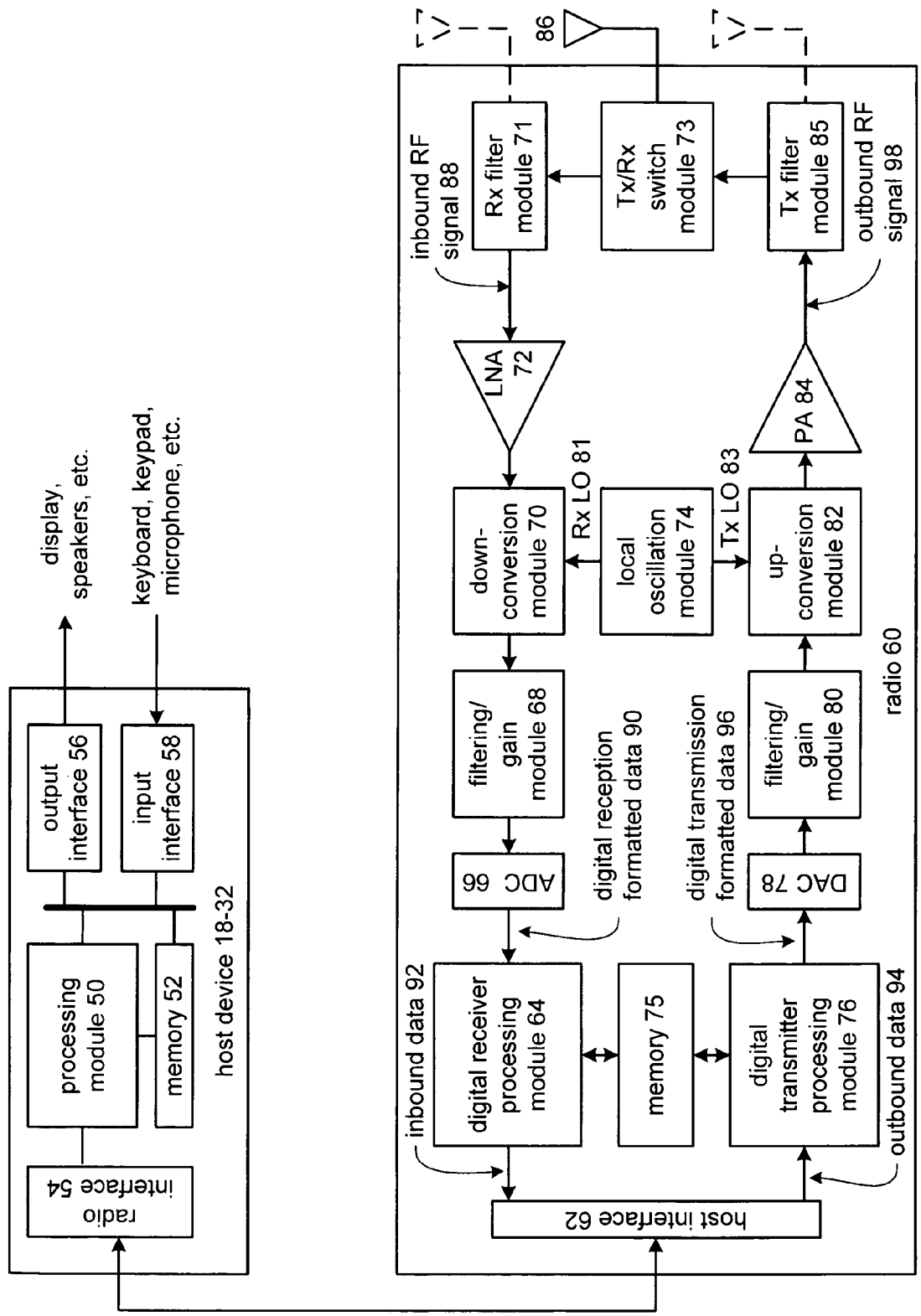
FIG. 2 is a schematic block diagram of a wireless communication device in accordance with the present invention.

FIG. 2 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/gain module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver baseband functions and digital transmitter baseband functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz. Further, the digital transmission formatted data 96 will be based on the channel width of the RF channel on which the data 96 will ultimately be transmitted. For example, the channel width may be 10 MHz, 20 MHz, or 40 MHz. Continuing with the example, if the channel is an OFDM (orthogonal frequency division multiplexing) channel, a 10 MHz wide channel may include 32 subcarrier frequencies, a 20 MHz wide channel may include 64 subcarrier frequencies, and a 40 MHz wide channel may include 128 subcarrier frequencies, where the number of subcarriers used per channel is at least partially based on the spectral masked configured for the channel. Configuring the spectral mask will be described in greater detail with reference to FIGS. 3–6.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device. Note that the bandpass regions of the filters 80 and 85 are dependent upon the configured spectral mask for the RF transmission, which may be determined by the digital transmitter processing module 76.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal. Note that the bandpass regions of the filters 71 and 68 are dependent upon the configured spectral mask for the RF transmission, which may be determined by the receiver processing module 64.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60 and the particular channel width of the channel. The host interface 62 provides the recaptured inbound data 92 to the host device 18–32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
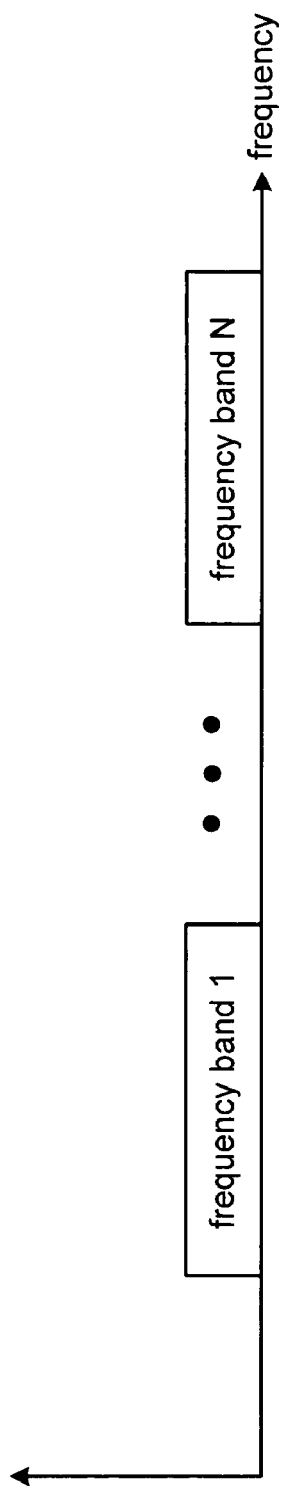
FIG. 3 is a diagram depicting frequency bands that may be used in accordance with the present invention.

FIG. 3 is a diagram depicting a plurality of frequency bands (e.g., frequency band 1 through frequency band N), which are defined by a governmental agency for particular wireless applications. For example, the Federal Communications Commission (FCC) defines, for the United States, frequency bands for specific uses and for which an FCC license is required (e.g., radio transmissions, television transmissions, etc.) and also defines frequency bands that are unlicensed and, as such, can be used for a variety of applications. For instance, the FCC has defined several frequency bands in the radio frequency spectrum as being unlicensed. Such unlicensed frequency bands include 902–928 MHz, 2.4–2.483 GHz and 5.75–5.85 GHz, which are collectively referred to as the ISM (Industrial Scientific Medical) band. Currently, the ISM band is used for in-building and system applications (e.g., bar code readers), industrial microwave ovens, wireless patient monitors, and wireless local area networks (WLAN).

In general, the frequency bands of FIG. 3 include, but are not limited to, 2.400–2.4835 GHz, 2.471–2.497 GHz, 5.15–5.25 GHz, 5.25–5.35 GHz, 5.47–5.725 GHz, 5.725 GHz–5.825 GHz, 4.9–5.3 GHz, and 5.85–5.925 GHz.

Figure 4:
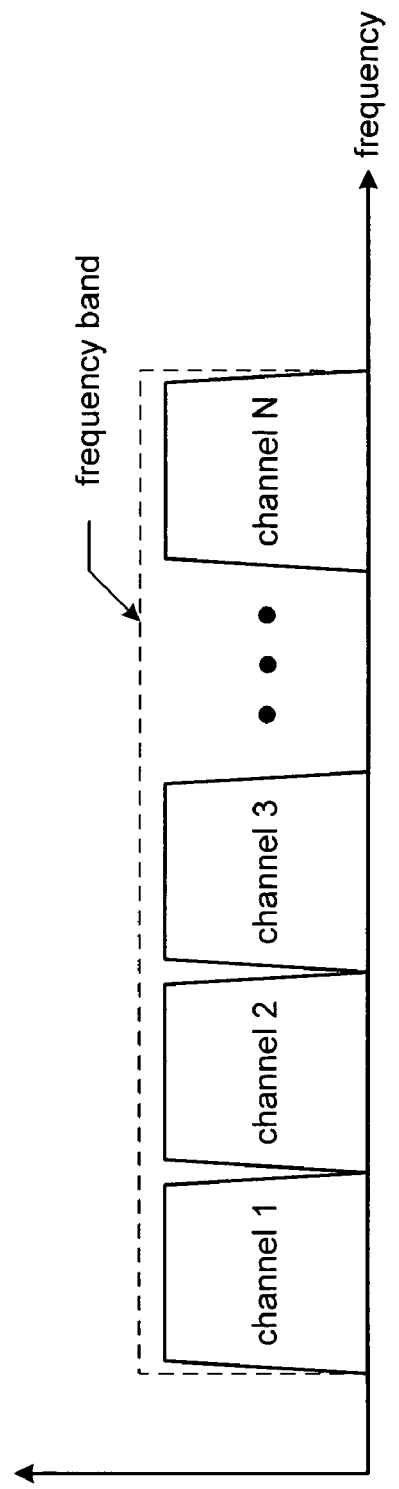
FIG. 4 is a diagram depicting channel partitioning of a frequency band in accordance with the present invention.

FIG. 4 is a diagram depicting a particular frequency band that is divided into a plurality of channels. In accordance with the present invention, the channel width of each channel is selectable. As such, for a given frequency band, the number of channels will vary depending on the selected channel width. For instance, in one embodiment of the present invention, the channel width may be selected in accordance with IEEE 802.11 (a) or (g), where IEEE 802.11 (a) provides wireless LAN operation specifications in the 5.15 to 5.35 GHz band. In general, the specified modulation schemes are based on Orthogonal Frequency Division Multiplexing (OFDM) which, for 802.11(a) divides the 5.15 to 5.35 GHz band into eight 20 MHz wide channels centered at 5.18, 5.20, 5.22, 5.24, 5.26, 5.28, 5.30, and 5.32 GHz. In another embodiment of the present invention, the 5.15 to 5.35 GHz band may be divided into eighteen 10 MHz wide channels, with the first channel centered at 5.165 GHz and the remaining eleven centered at 10 MHz increments therefrom. In yet another embodiment of the present invention, the 5.15 to 5.35 GHz band may be dividing into four 40 MHz wide channels, with the channels centered at 5.21, 5.25, 5.29, and 5.33 GHz. The same channel width selectivity may be applied to the 2.4–2.4835 GHz band covered by IEEE 802.11 (g), other frequency bands covered by an IEEE 802.11 standard, and/or any other wireless communication standard. The selectivity of the channel width provides for greater data throughput (e.g., at least twice the data rate of IEEE 802.11 (g)), for a diversity of applications, and/or for a single wireless communication device to support multiple wireless standards issued by various standard bodies, including governmental agencies.

Figure 5:
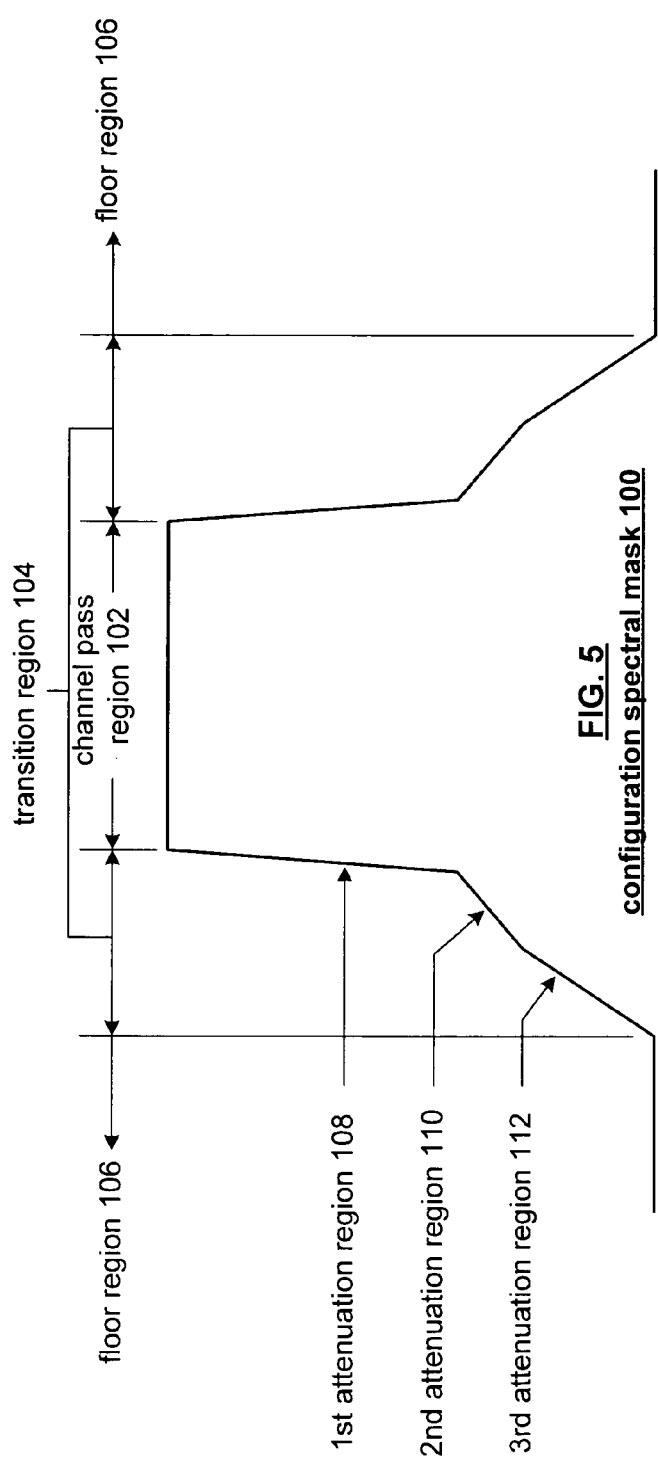
FIG. 5 is a diagram of a configurable spectral mask in accordance with an embodiment of the present invention.

FIG. 5 is a diagram of a configurable spectral mask 100 that includes a channel pass region 102, a transition region 104, and a floor region 106. The transition region 104 includes a first attenuation region 108, a second attenuation region 110, and a third attenuation region 112. Such a spectral mask 100 promotes interoperability, coexistence, and system capacity by limiting interference to adjacent and other channels for a wide variety of applications and/or standards. The out of band mask (e.g., the transition region 104 and the floor region 106) places a lower bound on interference levels that can be expected in receivers regardless of their particular implementation. In an effort to minimize the interference energy that appears on top of the desired signal, the out of band regions are made as small as possible.

To facilitate the above objective, the channel pass region 102, which encompasses the desired signal, is of a value as close to the channel bandwidth as feasible. The transition region 104, which bounds the adjacent channel interference and is limited by the bandwidth of the baseband processing modules 64 and 76 and the intermediate frequency mixing stage of the up-conversion module 82, is selected to minimize such interference (i.e., post IF inter-modulation distortion (IMD)). The floor region 106, which bounds other channel interference, which is outside the range of the filters and IMD limits and is generally limited by the local oscillation 74 phase noise, is selected based on achievable phase noise levels.

For instance, the transition region 104 should have a roll off based on the shoulder height of IMD, which may be assumed to be produced by a $3^{rd}$ order compressive non-linearity. Based on this assumption, the distorted transmit signal y(t) as a function of the ideal transmit signal x(t) can be expressed as: $y(t)=x(t)-f(Ax^3(t))$, where f( ) is a bandpass filter that removes any DC or harmonic signals produced by the non-linearity and $A=\frac{4}{3}(1/OIP_3)^2$, where OIP represents "Output $3^{rd}$ order intercept point", and in the frequency domain $Y(f)=X(f)-AX(F)*X(f)*X(f)$. As such, the distorted signal bandwidth will be no greater than three times the ideal signal bandwidth.

The floor region 106, which is limited by the local oscillator phase noise, may be based on L(f) convolved with the power spectral density of the ideal transmit signal, where L(f) is defined in IEEE std. 1139–1999 as the normalized phase noise spectral density and where y(t)=x(t) l(t) and Y(f)=X(f) * L(f), where x(t) represents the ideal RF signal, l(t) is a model of the phase nose generated in the local oscillator, y(t) represents the resulting signal, and Y(f) is the resulting signal in the frequency domain. Note that at 10 MHz or more from the carrier, phase noise spectrum is relatively flat. From this, a −123 dBc/Hz noise floor may be achieved for 20 MHz channels and a −126 dBc/Hz noise floor may be achieved for 40 MHz channels.

Figure 6:
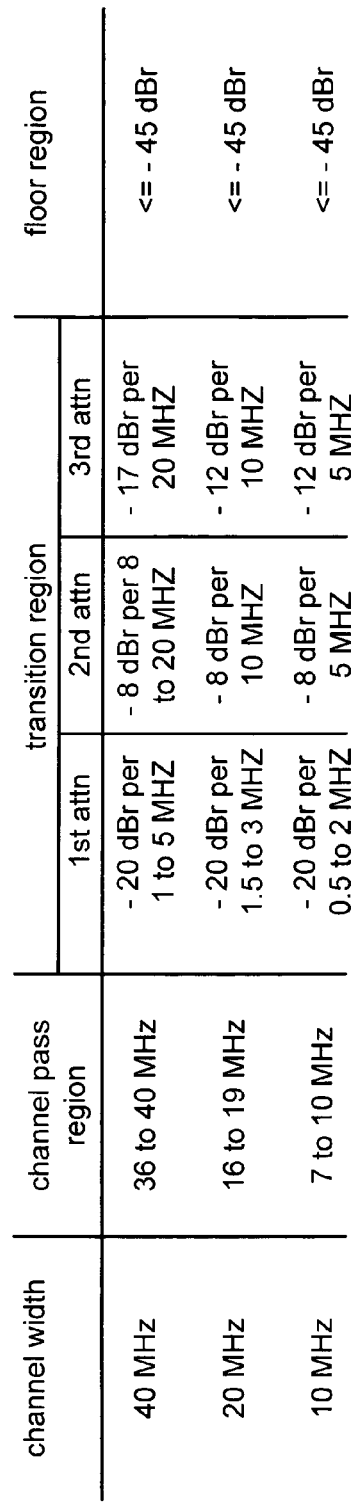
FIG. 6 is a table providing parametric examples of the configurable spectral mask of FIG. 5.

FIG. 6 is a table illustrating a few examples of values for a configurable spectral mask 100. While the table includes channel widths of 10, 20, and 40 MHz, one of average skill in the art will appreciate, other channel widths may be used. Further, the transition region may include more or less attenuation regions than the three shown in FIG. 5.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a configurable spectral mask for use in wireless communications. As one of average skill in the art will appreciate, other embodiments may be derived from the teachings of the present invention without deviating from the scope of the claims.

What is claimed is:

1. A method to provide a configurable spectral mask for a channel for use in a wireless communication system, the method comprises:

providing a channel pass region for the configurable spectral mask having a first usable signal bandwidth of a plurality of usable signal bandwidths corresponding to a first channel width of a plurality of channel widths;

providing a floor region for the configurable spectral mask having a first floor attenuation value of a plurality of floor attenuation values corresponding to the first channel width; and providing a transition region for the configurable spectral mask having a first transition attenuation of a plurality of transition attenuations from the channel pass region to the floor region, wherein the first attenuation region corresponds to the first channel width.

2. The method of claim 1, wherein providing the transition region further provides:
   a first attenuation region spectrally adjacent to the channel pass region;
   a third attenuation region spectrally adjacent to the floor region; and
   a second attenuation region spectrally coupling the first attenuation region and the third attenuation region.

3. The method of claim 2 wherein:
   providing the channel pass region further provides a second usable signal bandwidth of the plurality of usable signal bandwidths corresponding to a second channel width of the plurality of channel widths;
   providing the floor region further provides a second floor attenuation value of the plurality of floor attenuation values corresponding to the second channel width; and
   providing the transition region further provides a second transition attenuation of the plurality of transition attenuations from the channel pass region to the floor region, wherein the second transition attenuation corresponds to the second channel width.

4. The method of claim 3 wherein:
   the first channel width being 40 Mega Hertz (MHz);
   the second channel width being 20 MHz;
   the first usable signal bandwidth being in a range of 36 MHz to 40 MHz;
   the second usable signal bandwidth being in a range of 16 to 19 MHz;
   the first floor value being at least −45 relative decibels (dBr); and
   the second floor value being approximately −40 to −45 dBr.

5. The method of claim 4 wherein:
   for the first transition attenuation:
      the first attenuation region including a first attenuation slope of approximately −20 dBr per 1 MHz to 5 MHz;
      the second attenuation region including a second attenuation slope of approximately −8 dBr per 20 MHz; and
      the third attenuation region including a third attenuation slope of at least −17 dBr per 20 MHz;
   for the second transition attenuation:
      the first attenuation region including the first attenuation slope of approximately −20 dBr per 1.5 MHz to 3 MHz;
      the second attenuation region including a second attenuation slope of approximately −8 dBr per 10 MHz; and
      the third attenuation region including a third attenuation slope of at least −12 dBr per 10 MHz.

6. The method of claim 3 wherein:
   providing the channel pass region further provides a third usable signal bandwidth of the plurality of usable signal bandwidths corresponding to a third channel width of the plurality of channel widths;
   providing the floor region further provides a third floor attenuation value of the plurality of floor attenuation values corresponding to the third channel width; and
   providing the transition region further provides a third transition attenuation of the plurality of transition attenuations from the channel pass region to the floor region, wherein the third attenuation region corresponds to the third channel width.

7. The method of claim 6 wherein:
   the third channel width being 10 MHz;
   the third usable signal bandwidth being in range of 7–10 MHz; and
   the third floor value being at least −40 to −45 dBr.

8. The method of claim 7 wherein:
   for the third transition attenuation:
      the first attenuation region including the first attenuation slope of approximately −20 dBr per 0.5 MHz to 2 MHz;
      the second attenuation region including the second attenuation slope of approximately −8 dBr per 5 MHz; and
      the third attenuation region including the third attenuation slope of at least −12 dBr per 5 MHz.

9. An apparatus for transmitting via a channel in a high throughput wireless local area network, the apparatus comprises:
   processing module;
   memory operably coupled to the processing module, wherein the memory stores operational instructions that cause the processing module to:
      establish a channel pass region to provide a first usable signal bandwidth of a plurality of usable signal bandwidths corresponding to a first channel width of a plurality of channel widths;
      establish a floor region to provide a first floor attenuation value of a plurality of floor attenuation values corresponding to the first channel width; and
      establish a transition region to provide a first transition attenuation of a plurality of transition attenuations from the channel pass region to the floor region, wherein the first attenuation region corresponds to the first channel width.

10. The apparatus of claim 9, wherein the transition region comprises:
   a first attenuation region spectrally adjacent to the channel pass region;
   a third attenuation region spectrally adjacent to the floor region; and
   a second attenuation region spectrally coupling the first attenuation region and the third attenuation region.

11. The apparatus of claim 10 further comprises:
   the channel pass region providing a second usable signal bandwidth of the plurality of usable signal bandwidths corresponding to a second channel width of the plurality of channel widths;
   the floor region providing a second floor attenuation value of the plurality of floor attenuation values corresponding to the second channel width; and
   the transition region providing a second transition attenuation of the plurality of transition attenuations from the channel pass region to the floor region, wherein the second transition attenuation corresponds to the second channel width.

12. The apparatus of claim 11 further comprises:
   the first channel width being 40 Mega Hertz (MHz);
   the second channel width being 20 MHz;
   the first usable signal bandwidth being in a range of 36 MHz to 40 MHz;
   the second usable signal bandwidth being in a range of 16 to 19 MHz;
   the first floor value being at least −45 relative decibels (dBr); and
   the second floor value being approximately −40 to −45 dBr.

13. The apparatus of claim 12 further comprises:
for the first transition attenuation:
  the first attenuation region including a first attenuation slope of approximately −20 dBr per 1 MHz to 5 MHz;
  the second attenuation region including a second attenuation slope of approximately −8 dBr per 20 MHz; and
  the third attenuation region including a third attenuation slope of at least −17 dBr per 20 MHz;
for the second transition attenuation:
  the first attenuation region including the first attenuation slope of approximately −20 dBr per 1.5 MHz to 3 MHz;
  the second attenuation region including a second attenuation slope of approximately −8 dBr per 10 MHz; and
  the third attenuation region including a third attenuation slope of at least −12 dBr per 10 MHz.

14. The apparatus of claim 11 further comprises:
the channel pass region providing a third usable signal bandwidth of the plurality of usable signal bandwidths corresponding to a third channel width of the plurality of channel widths;
the floor region providing a third floor attenuation value of the plurality of floor attenuation values corresponding to the third channel width; and
the transition region providing a third transition attenuation of the plurality of transition attenuations from the channel pass region to the floor region, wherein the third attenuation region corresponds to the third channel width.

15. The apparatus of claim 14 further comprises:
the third channel width being 10 MHz;
the third usable signal bandwidth being in range of 7–10 MHz; and
the third floor value being at least −40 dBr.

16. The apparatus of claim 15 further comprises:
for the third transition attenuation:
  the first attenuation region including the first attenuation slope of approximately −20 dBr per 0.5 MHz to 2 MHz;
  the second attenuation region including the second attenuation slope of approximately −8 dBr per 5 MHz; and
the third attenuation region including the third attenuation slope of at least −12 dBr per 5 MHz.

17. A radio frequency (RF) transmitter comprises:
baseband processing module operably coupled to:
  establish a configurable spectral mask of a channel for a high data throughput wireless communication in a wireless local area network by:
    establish a channel pass region to provide a first usable signal bandwidth of a plurality of usable signal bandwidths corresponding to a first channel width of a plurality of channel widths;
    establish a floor region to provide a first floor attenuation value of a plurality of floor attenuation values corresponding to the first channel width; and
    establish a transition region to provide a first transition attenuation of a plurality of transition attenuations from the channel pass region to the floor region, wherein the first attenuation region corresponds to the first channel width; and
  convert outbound data into outbound baseband signals in accordance with the first useable signal bandwidth of the channel; and
radio transmitter operably coupled to convert the outbound baseband signals into outbound radio frequency (RE) signals and to transmit the outbound RF signals in accordance with the configurable spectral mask.

18. The RE transmitter of claim 17, wherein the transition region comprises:
a first attenuation region spectrally adjacent to the channel pass region;
a third attenuation region spectrally adjacent to the floor region; and
a second attenuation region spectrally coupling the first attenuation region and the third attenuation region.

19. The RE transmitter of claim 18 further comprises:
the channel pass region providing a second usable signal bandwidth of the plurality of usable signal bandwidths corresponding to a second channel width of the plurality of channel widths;
the floor region providing a second floor attenuation value of the plurality of floor attenuation values corresponding to the second channel width; and
the transition region providing a second transition attenuation of the plurality of transition attenuations from the channel pass region to the floor region, wherein the second transition attenuation corresponds to the second channel width.

20. The RF transmitter of claim 19 further comprises:
the first channel width being 40 Mega Hertz (MHz);
the second channel width being 20 MHz;
the first usable signal bandwidth being in a range of 36 MHz to 40 MHz;
the second usable signal bandwidth being in a range of 16 to 19 MHz;
the first floor value being at least −45 relative decibels (dBr); and
the second floor value being approximately −40 to −45 dBr.

21. The RF transmitter of claim 20 further comprises:
for the first transition attenuation:
  the first attenuation region including a first attenuation slope of approximately −20 dBr per 1 MHz to 5 MHz;
  the second attenuation region including a second attenuation slope of approximately −8 dBr per 20 MHz; and
  the third attenuation region including a third attenuation slope of at least −17 dBr per 20 MHz;
for the second transition attenuation:
  the first attenuation region including the first attenuation slope of approximately −20 dBr per 1.5 MHz to 3 MHz;
  the second attenuation region including a second attenuation slope of approximately −8 dBr per 10 MHz; and
  the third attenuation region including a third attenuation slope of at least −12 dBr per 10 MHz.

22. The RF transmitter of claim 19 further comprises:
the channel pass region providing a third usable signal bandwidth of the plurality of usable signal bandwidths corresponding to a third channel width of the plurality of channel widths;

the floor region providing a third floor attenuation value of the plurality of floor attenuation values corresponding to the third channel width; and the transition region providing a third transition attenuation of the plurality of transition attenuations from the channel pass region to the floor region, wherein the third attenuation region corresponds to the third channel width.

23. The RF transmitter of claim 22 further comprises:

the third channel width being 10 MHz;

the third usable signal bandwidth being in range of 7–10 MHz; and the third floor value being at least −40 to −45 dBr.

24. The RF transmitter of claim 23 further comprises:

for the third transition attenuation:

the first attenuation region including the first attenuation slope of approximately −20 dBr per 0.5 MHz to 2 MHz;

the second attenuation region including the second attenuation slope of approximately −8 dBr per 5 MHz; and the third attenuation region including the third attenuation slope of at least −12 dBr per 5 MHz.

\* \* \* \* \*

UNITED STATES PATENT AND TRADEMARK OFFICE
CERTIFICATE OF CORRECTION

| | | |
|---|---|---|
| PATENT NO. | : 7,162,204 B2 | Page 1 of 1 |
| APPLICATION NO. | : 10/778754 | |
| DATED | : January 9, 2007 | |
| INVENTOR(S) | : Christopher Hansen et al. | |

It is certified that error appears in the above-identified patent and that said Letters Patent is hereby corrected as shown below:

Column 12, line 6, in Claim 17: replace "(RE)" with --(RF)--.

Column 12, line 8, in Claim 18: replace "RE" with --RF--.

Column 12, line 17, in Claim 19: replace "RE" with --RF--.

Signed and Sealed this

Twenty-seventh Day of January, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,162,204 B2 | Page 1 of 1 |
| APPLICATION NO. | : 10/778754 | |
| DATED | : January 9, 2007 | |
| INVENTOR(S) | : Christopher J. Hansen et al. | |

It is certified that error appears in the above-identified patent and that said Letters Patent is hereby corrected as shown below:

Title Page, Item (60) Related U.S. Application Data: Insert --Provisional application No. 60/524,528 filed on 24 Nov. 2003.--

Specification, Col. 1, line 6: before "BACKGROUND OF THE INVENTION" insert --The present U.S. Utility Patent Application claims priority pursuant to 35 U.S.C. § 119(e) to U.S. Provisional Application Serial No. 60/524,528 entitled "Configurable Spectral Mask For Use In A High Data Throughput Wireless Communication" filed 24 Nov. 2003, pending.--

Col. 9, line 1, in Claim 1: after "first" insert --transition--

Signed and Sealed this
Twenty-fifth Day of September, 2012

David J. Kappos
*Director of the United States Patent and Trademark Office*